(12) United States Patent
Seo

(10) Patent No.: US 7,535,119 B2
(45) Date of Patent: May 19, 2009

(54) POWER CONTROL APPARATUS OF A COMPLEX TERMINAL

(75) Inventor: Ho-Soo Seo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 583 days.

(21) Appl. No.: 10/923,399

(22) Filed: Aug. 20, 2004

(65) Prior Publication Data

US 2005/0041352 A1 Feb. 24, 2005

(30) Foreign Application Priority Data

Aug. 22, 2003 (KR) ................... 10-2003-0058335

(51) Int. Cl.
- *H02J 1/10* (2006.01)
- *H02J 7/00* (2006.01)
- *H04B 1/04* (2006.01)
- *H04B 1/16* (2006.01)
- *H04B 1/38* (2006.01)

(52) U.S. Cl. ............. 307/46; 307/45; 307/65; 307/66; 307/81; 455/127.5; 455/343.6; 455/573

(58) Field of Classification Search ............. 307/81, 307/44, 45, 46, 65, 80, 82; 455/127.5, 343.6, 455/573

See application file for complete search history.

(56) References Cited

U.S. PATENT DOCUMENTS

| | | | | |
|---|---|---|---|---|
| 5,278,771 A | * | 1/1994 | Nyenya | ........... 700/293 |
| 5,783,964 A | * | 7/1998 | Eitan | ........... 327/408 |
| 5,910,750 A | * | 6/1999 | Harada et al. | ........... 327/544 |
| 6,949,843 B2 | * | 9/2005 | Dubovsky | ........... 307/64 |

OTHER PUBLICATIONS

MC68EZ328 (DragonBall™) Integrated Portable System Processor Product Brief, © 2001 Motorola, Inc.

* cited by examiner

*Primary Examiner*—Stephen W Jackson
*Assistant Examiner*—Hal I Kaplan
(74) *Attorney, Agent, or Firm*—The Farrell Law Firm, PC

(57) ABSTRACT

A power control apparatus of a complex terminal is disclosed that includes a DC/DC converter for outputting an auxiliary power supplied from an auxiliary battery after adjusting a level of voltage of the auxiliary power to a required input voltage level of the complex terminal; a second voltage sensor for measuring voltage of a main power outputted from a main battery, and controlling the auxiliary power of the auxiliary battery to be inputted to the DC/DC converter before the measured voltage of the main power becomes lower than a predetermined voltage; and a first voltage sensor for interrupting supply of the main power from the main battery to the complex terminal and controlling the auxiliary power outputted from the DC/DC converter to be supplied to the complex terminal, when the measured voltage of the main power becomes lower than the predetermined voltage.

15 Claims, 5 Drawing Sheets

POWER CONTROL APPARATUS OF A COMPLEX TERMINAL

PRIORITY

This application claims priority to an application entitled "Power Control Apparatus of a Complex Terminal" filed in the Korean Industrial Property Office on Aug. 22, 2003 and assigned Serial No. 2003-58335, the contents of which are hereby incorporated by reference.

BACKGROUND OF THE INVENTION

1. Field of the Invention

The present invention relates to a complex terminal, and more particularly to a power control apparatus of a complex terminal.

2. Description of the Related Art

In general, a complex terminal receives electric power from a rechargeable battery detachably assembled with the complex terminal. The complex terminal may lose data when power supply from the battery to the terminal is stopped due to reasons such as separation or discharge of the battery. In preparation for unexpected interruption of power supply due to separation or discharge of the battery as described above, the complex terminal includes a separate auxiliary battery built in the terminal, which can supply electric power to the terminal in such a case.

FIG. 1 is a block diagram of a conventional complex terminal. Referring to FIG. 1, a conventional complex terminal may include a main battery 2 for supplying electric power, a phone module 4 for performing the function of a portable phone, and a PDA (Personal Digital Assistant) module 6 for performing the function of a personal information terminal or PDA. The PDA module 6 includes a PDA power supply 22, a first switch 24, a first voltage sensor 26, a second voltage sensor 28, a charger 32, an auxiliary battery 34, a second switch 36, a third switch 30, a DC/DC converter 38, a PDA controller 40, and a storage unit 42. The PDA module 6 is operated by the electric power supplied from the main battery 2.

The first voltage sensor 26 of the PDA module 6 detects voltage applied from the main battery 2. The first voltage sensor 26 directs the PDA module 6 to receive electric power from the auxiliary battery 34 instead of the main battery 2 when the detected voltage is lower than a predetermined value (e.g., 3.0 V). Here, while the power source to the PDA module 6 is switched from the main battery 2 to the auxiliary battery 34, the voltage applied to the PDA controller 40 becomes unstable.

FIG. 2 is a graph showing the voltage applied to the PDA controller 40 in a typical complex terminal. In the graph shown in FIG. 2, t1 represents a time point at which the voltage applied from the main battery 2 to the PDA controller 40 begins to be lowered due to discharge of the main battery 2 or separation of the main battery 2 from the complex terminal.

Referring back to FIG. 1, when the voltage of the electric power supplied from the main battery 2 becomes lower than a predetermined value (e.g., 3.0 V), the first voltage sensor 26 directs the first switch 24 and the second switch 36 to allow electric power to be supplied to the PDA controller 40 from the auxiliary battery 34 instead of the main battery 2. Specifically, when the voltage of the electric power supplied from the main battery 2 becomes lower than a predetermined value (e.g., 3.0 V) due to discharge of the main battery 2 or separation of the main battery 2 from the complex terminal, the first voltage sensor 26 directs the first switch 24 to connect the DC/DC converter 38 with the PDA controller 40, directs the second switch 36 to connect the auxiliary battery 34 with the DC/DC converter 38, and notifies the PDA controller 40 that the electric power is supplied to the PDA controller 40 from the auxiliary battery 34 instead of the main battery 2. When the voltage of the electric power supplied from the main battery 2 becomes lower than a second value (e.g., 3.2 V) due to discharge of the main battery 2 or separation of the main battery 2 from the complex terminal, the second voltage sensor 28 directs the third switch 30 to disconnect the charger 32 and the main battery 2 from each other, so as to prevent electric current from flowing backward from the charger 32 to the main battery 2.

When the auxiliary battery 34 and the DC/DC converter 38 are connected and the DC/DC converter 38 and the PDA controller 40 are connected, the PDA controller 40 can receive electric power from the auxiliary battery 34 instead of the main battery 2. However, during the process wherein the connection between the auxiliary battery 34 and the DC/DC converter 38 and the connection between the DC/DC converter 38 and the PDA controller 40 are established, the voltage of the electric power supplied to the PDA controller 40 becomes unstable. This is because the electric power supplied through the DC/DC converter 38 from the auxiliary battery 34 is not instantly supplied to the PDA controller 40. In other words, since the electric power is not instantly supplied to an input node of the PDA controller 40, the voltage has an unstable portion as designated by C in FIG. 2. This unstable voltage may cause misoperation of the PDA module 6 and loss of data in the complex terminal.

SUMMARY OF THE INVENTION

Accordingly, the present invention has been made to solve the above-mentioned problems occurring in the prior art, and an object of the present invention is to provide a power control apparatus of a complex terminal, which can stabilize voltage applied to a PDA module while electric power source is switched from a main battery to an embedded auxiliary battery, and thus can reduce loss of data in the complex terminal.

It is another object of the present invention to provide a power control apparatus of a complex terminal, in which a DC/DC circuit for converting voltage of an embedded auxiliary battery can be more rapidly operated while electric power source is switched from a main battery to the auxiliary battery, so that the voltage applied to a PDA module can be stabilized and thus loss of data in the complex terminal can be reduced.

In order to accomplish this object, there is provided a power control apparatus of a complex terminal which includes a main battery and an auxiliary battery, the power control apparatus comprising: a DC/DC converter for outputting an auxiliary power supplied from the auxiliary battery after adjusting a level of voltage of the auxiliary power to a required input voltage level of the complex terminal; a second voltage sensor for measuring voltage of a main power outputted from the main battery, and controlling the auxiliary power of the auxiliary battery to be inputted to the DC/DC converter before the measured voltage of the main power becomes lower than a predetermined voltage; and a first voltage sensor for interrupting supply of the main power from the main battery to the complex terminal and controlling the auxiliary power outputted from the DC/DC converter to be supplied to the complex terminal, when the measured voltage of the main power becomes lower than the predetermined voltage.

In accordance with another aspect of the present invention, there is provided a power control apparatus of a complex terminal which includes an external main battery, an embedded auxiliary battery, and a PDA controller, the power control apparatus comprising: a PDA power supply for outputting a main power supplied from the main battery after adjusting a level of voltage of the main power to a required input voltage level of the PDA controller; a DC/DC converter for outputting an auxiliary power supplied from the auxiliary battery after adjusting a level of voltage of the auxiliary power to the input voltage level of the PDA controller; a first switch for selectively connecting the PDA controller to one of the PDA power supply and the DC/DC converter; a first voltage sensor for outputting an interrupt signal which notifies that the PDA controller cannot receive the main power from the main battery, and controlling the first switch to connect the PDA controller with the DC/DC converter so that the PDA controller can receive the auxiliary power from the auxiliary battery, when the voltage of the main power from the main battery becomes lower than a first voltage; a second switch for connecting or disconnecting the auxiliary battery and the DC/DC converter with or from each other; and a second voltage sensor for controlling the second switch to connect the auxiliary battery and the DC/DC converter with each other so that the auxiliary power of the auxiliary battery can be instantly applied to the PDA controller, when the voltage of the main power from the main battery becomes lower than a second voltage, wherein, when the PDA controller receives the interrupt signal and is connected with the DC/DC converter, the PDA controller instantly receives the auxiliary power from the auxiliary battery, enters into a sleep mode, and stores current data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
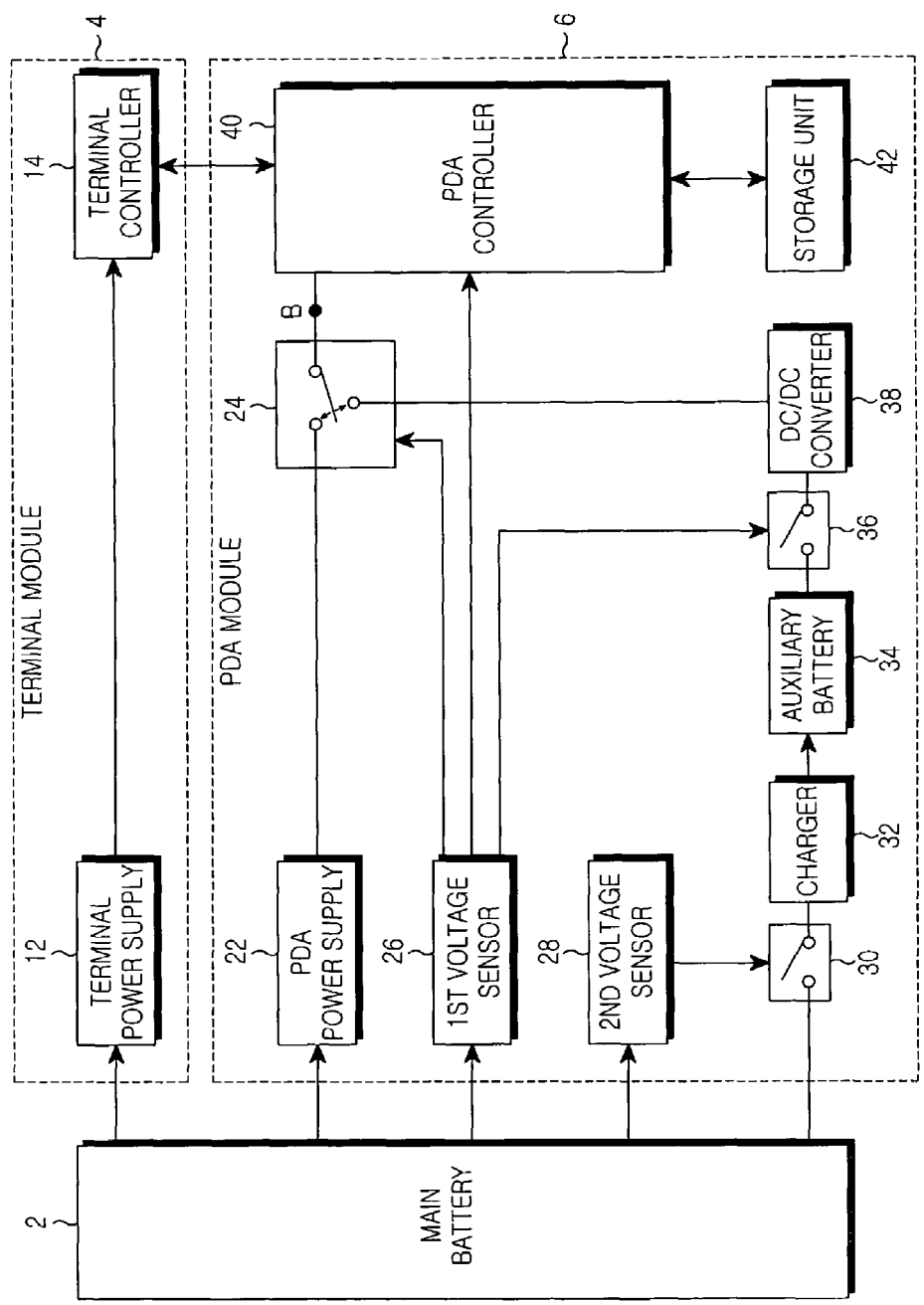
FIG. 1 is a block diagram of a conventional complex terminal.
Figure 2:
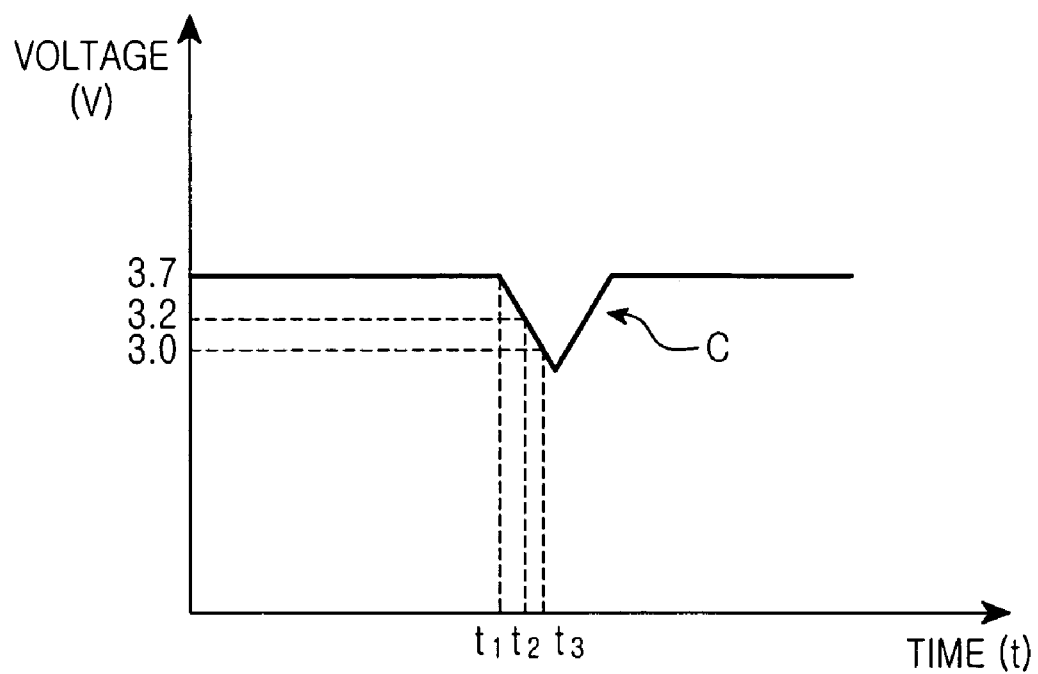
FIG. 2 is a graph showing voltage applied to a PDA controller in a typical complex terminal, which changes according to time when a main battery is separated or discharged.
Figure 3:
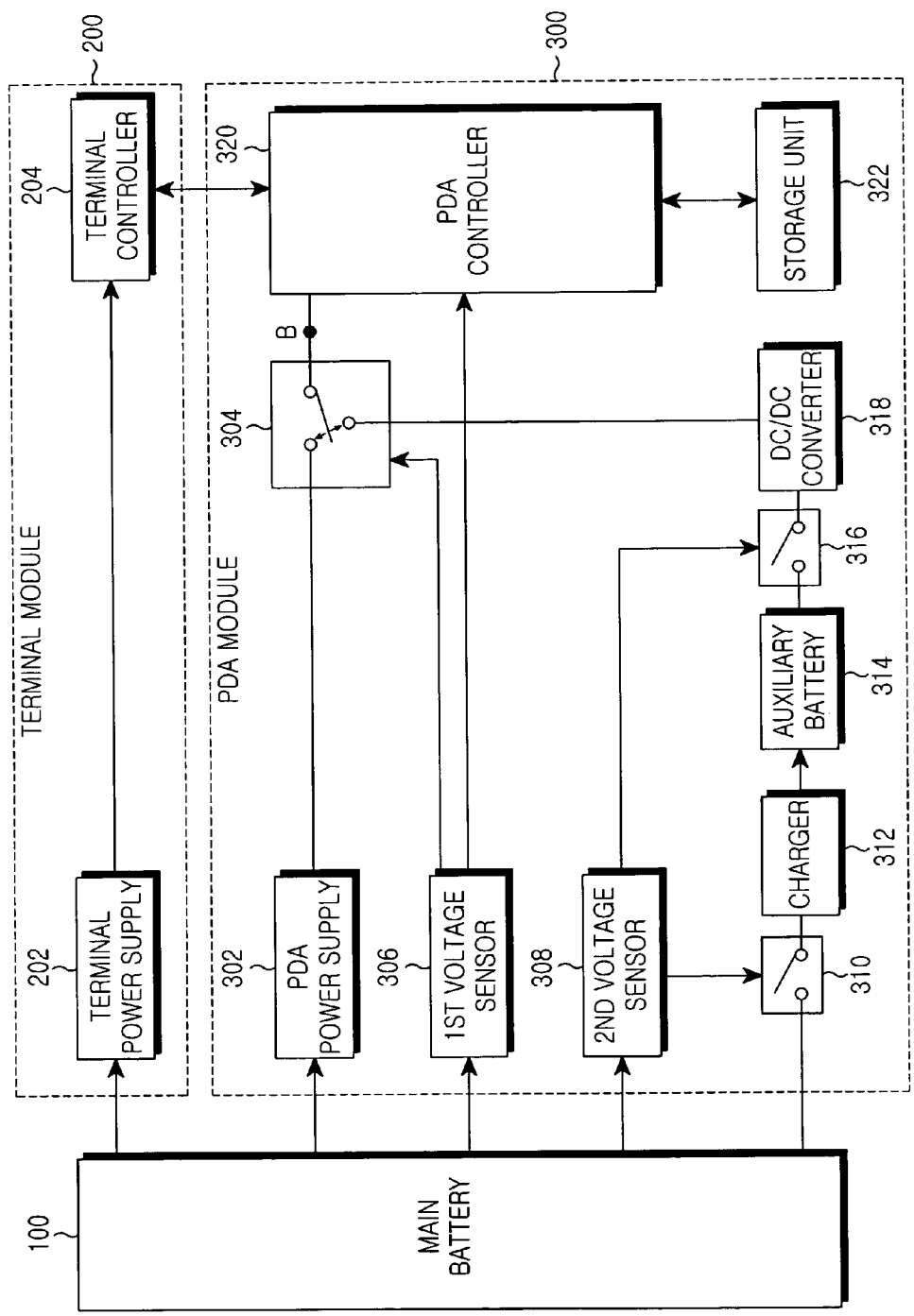
FIG. 3 is a block diagram of a complex terminal having a power control apparatus according to an embodiment of the present invention.

Referring to FIG. 3, a complex terminal according to an embodiment of the present invention roughly includes a main battery 100 supplying electric power, a phone module 200 performing the function of a portable phone, and a PDA module 300 performing the function of a personal information terminal or PDA.

The phone module 200 includes a terminal power supply 202 and a terminal controller 204. The terminal power supply 202 transfers electric power supplied from the main battery 100 to devices in the phone module 200, such as the terminal controller 204. The terminal controller 204 controls general operation of the phone module 200.

The PDA module 300 includes a PDA power supply 302, a first switch 304, a first voltage sensor 306, a second voltage sensor 308, a second switch 316, a charger 312, an auxiliary battery 314, a third switch 310, a DC/DC converter 318, a PDA controller 320, and a storage unit 322.

The PDA power supply 302 outputs the electric power supplied from the main battery 100 after adjusting the voltage level of the electric power to a required input voltage level of the PDA controller 320.

The first switch 304 is located between the PDA power supply 302, the PDA controller 320, and the DC/DC converter 318, so as to connect the PDA power supply 302 and the PDA controller 320 or the PDA controller 320 and the DC/DC converter 318.

The first voltage sensor 306 senses the voltage of the electric power supplied from the main battery 100. When the sensed voltage is higher than a first predetermined voltage (e.g., 3.0 V), the first voltage sensor 306 directs the first switch 304 to connect the PDA controller 320 with the PDA power supply 302 so that the PDA controller 320 can receive electric power from the main battery 100. The first predetermined voltage has a magnitude capable of operating the PDA controller 320, for example, 3.0 V. In contrast, when the sensed voltage is lower than the first predetermined voltage, the first voltage sensor 306 directs the first switch 304 to connect the DC/DC converter 318 and the PDA controller 320 so that the PDA controller 320 can receive electric power from the auxiliary battery 314. Further, when the sensed voltage is lower than the first predetermined voltage, the first voltage sensor 306 sends an interrupt signal to the PDA controller 320. The signal indicates that the PDA controller 320 cannot receive the electric power from the main battery 100. The interrupt signal causes the PDA controller 320 to enter into a sleep mode.

When the charger 312 is connected with the main battery 100, the charger 312 charges the auxiliary battery 314 by means of the electric power supplied from the main battery 100.

The third switch 310 is located between the main battery 100 and the charger 312, so as to connect or disconnect the main battery 100 and the charger 312.

The auxiliary battery 314 is charged through the charger 312. When the auxiliary battery 314 has been charged, it can replace the main battery 100 in supplying electric power to the PDA controller 320.

The second switch 316 is located between the auxiliary battery 314 and the DC/DC converter 318, so as to connect or disconnect the auxiliary battery 314 and the DC/DC converter 318.

When the DC/DC converter 318 has been connected with the auxiliary battery 314, the DC/DC converter 318 outputs the electric power supplied from the auxiliary battery 314 after adjusting the voltage level of the electric power to a required input voltage level of the PDA controller 320.

The second voltage sensor 308 senses the voltage of the electric power supplied from the main battery 100. When the sensed voltage becomes a second threshold voltage (e.g., 3.2 V), the second voltage sensor 308 directs the third switch 310 to disconnect the main battery 100 and the charger 312 from each other, thereby preventing the auxiliary battery 314 from being discharged toward the main battery 100. Further, when the sensed voltage becomes the second voltage, the second threshold voltage sensor 308 directs the second switch 316 to connect the auxiliary battery 314 with the DC/DC converter 318 and adjusts the voltage level of the electric power supplied from the auxiliary battery 314 to a required input voltage level of the PDA controller 320. The second voltage is higher than the first voltage by a difference, which is sufficient for normal operation of the PDA controller 320 before the PDA controller 320 receives the interrupt signal and enters into the sleep mode.

The PDA controller 320 controls general operation of the PDA module 300. The PDA controller 320 receives electric power from the main battery 100 when the voltage of the main battery 100 is higher than the first voltage and from the auxiliary battery 314 when the voltage of the main battery 100 is lower than or equal to the first threshold voltage. When the PDA controller 320 has received the interrupt signal from the first voltage sensor 306, which notifies that the PDA controller 320 cannot receive the electric power from the main battery 100, the PDA controller 320 stops all the processes currently in progress, enters into the sleep mode (power-saving mode), and stores data of the complex terminal.

A power control apparatus of a complex terminal, according to an embodiment of the present invention, operates the DC/DC converter 318 before the interrupt signal is inputted to the PDA controller 320. This is different from a power control apparatus of a conventional complex terminal. As a result, the voltage of the electric power supplied through the DC/DC converter 318 from the auxiliary battery 314 can be instantly applied to the PDA controller 320.

Figure 4:
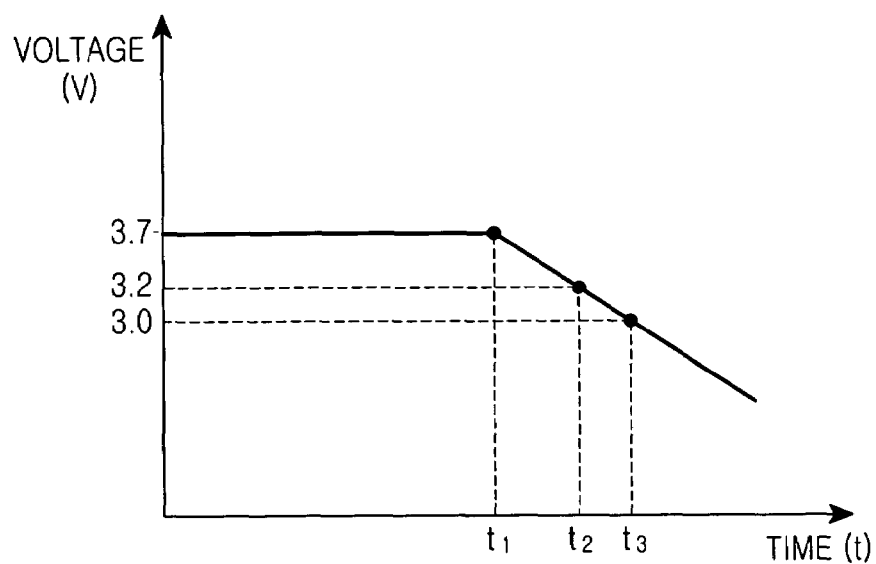
FIG. 4 is a graph showing voltage applied to a PDA module, which changes according to time when a main battery is discharged, according to an embodiment of the present invention.
Figure 5:
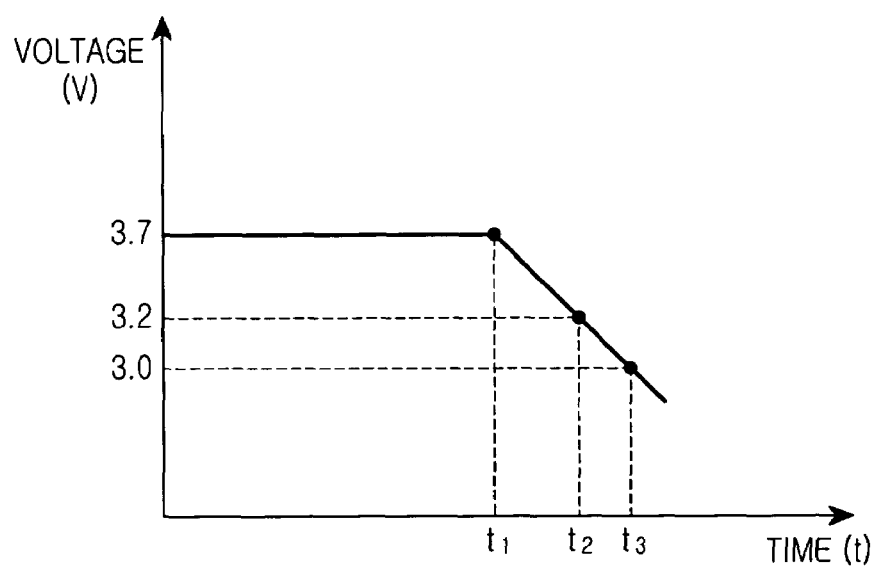
FIG. 5 is a graph showing voltage applied to a PDA module, which changes according to time when a main battery is assembled with or separated from a complex terminal, according to an embodiment of the present invention.
Figure 6:
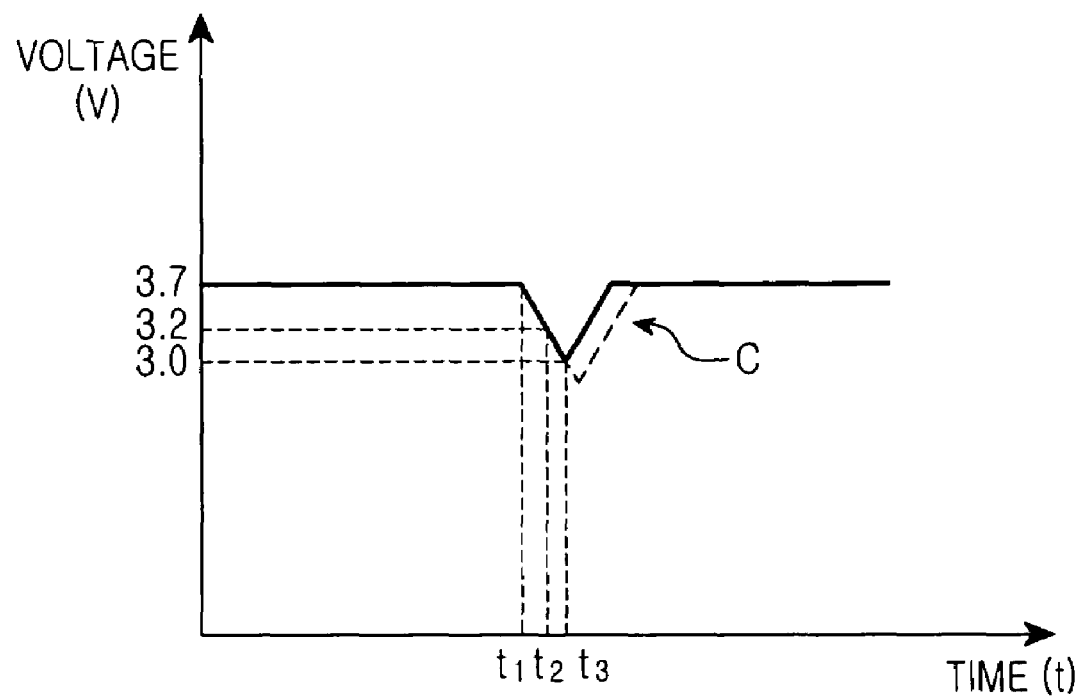
FIG. 6 is a graph showing voltage applied to a PDA controller, which changes according to time when a main battery is discharged, or assembled with or separated from the complex terminal, according to an embodiment of the present invention.

FIG. 4 is a graph showing the voltage applied to the PDA module 300, which changes according to time when the main battery 100 is discharged, according to an embodiment of the present invention. FIG. 5 is a graph showing the voltage applied to the PDA module 300, which changes according to time when the main battery 100 is attached to or separated from the complex terminal, according to an embodiment of the present invention. FIG. 6 is a graph showing the voltage applied to the PDA controller 320 according to an embodiment of the present invention, which changes according to time when the main battery 100 is discharged, attached to, or separated from the complex terminal.

Hereinafter, a method according to an embodiment of the present invention will be described in detail, which can reduce a phenomenon in which the voltage applied to the PDA controller 320 becomes unstable when the main battery 100 is discharged, or assembled with or separated from the complex terminal.

In FIG. 4, t1 represents a time point at which the voltage applied from the main battery 100 to the PDA module 300 begins to be lowered due to discharge of the main battery 100. In FIG. 5, t1 represents a time point at which the voltage applied from the main battery 100 to the PDA module 300 begins to be lowered due to separation of the main battery 100 from the complex terminal.

In FIGS. 4 and 5, t2 represents a time point at which the voltage applied to the PDA module 300 becomes the second voltage (e.g., 3.2 V) due to discharge or separation of the main battery 100, and t3 represents a time point at which the voltage applied to the PDA module 300 becomes the first voltage (e.g., 3.0 V).

When the voltage of the electric power supplied from the main battery 100 reaches the second voltage while decreasing as described above, that is, at the time point t2, the second voltage sensor 308 directs the third switch 310 to disconnect the main battery 100 and the charger 312 from each other, thereby interrupting charge of the auxiliary battery 314. Further, at the time point t2, the second voltage sensor 308 directs the second switch 316 to connect the auxiliary battery 314 and the DC/DC converter 318, thereby enabling the electric power to be supplied from the auxiliary battery 314 to the DC/DC converter 318.

Further, at the time point t3 at which the electric power supplied from the main battery 100 becomes lower than the first voltage, the first voltage sensor 306 transfers an interrupt signal to the PDA controller 320, which notifies that the main battery 100 cannot supply the electric power. Further, at the time point t3, the first voltage sensor 306 directs the first switch 304 to connect the DC/DC converter 318 and the PDA controller 320. Herein, the interval between t2 and t3 is several milliseconds. That is, a power control apparatus according to the present invention connects the auxiliary battery 314 and the DC/DC converter 318 with each other by means of the second switch 316 several milliseconds before the PDA controller 320 receives the interrupt signal. Therefore, at the time point t3, the PDA controller 320 can instantly receive the electric power through the DC/DC converter 318 simultaneously while receiving the interrupt signal. As a result, instability of the voltage applied to the PDA controller 320 can be reduced as shown in FIG. 6 in the complex terminal according to the present invention, in comparison with the conventional complex terminal.

According to experiments, when the PDA controller 320 was realized by a Dragonball-CPU, it took 800 µs for the PDA controller 320 to enter into the sleep mode after the interrupt signal was inputted. A time delay in the operation of the second voltage sensor 308 was about 100 µs, and a time delay in the operation of the DC/DC converter 318 was about 10 µs. Therefore, the interval between t2 and t3 is sufficient for normal application of the voltage to the PDA controller 320 before the PDA controller 320 enters into the sleep mode after receiving the interrupt signal.

In the power control apparatus of a complex terminal according to the present invention as described above, the DC/DC converter is operated before an interrupt signal for entering the PDA controller into the sleep mode is outputted to the PDA controller. This is different from the operation of the power control apparatus of the typical complex terminal. Therefore, the present invention can reduce the instability of the voltage applied to the PDA controller, which may exist due to time it takes for the DC/DC converter to receive the electric power from the auxiliary battery and to supply the electric power to the PDA controller. That is, in the complex terminal according to the present invention, while electric power source is switched from the main battery to the embedded auxiliary battery, the DC/DC circuit for converting the voltage of the auxiliary battery is operated more rapidly, so that the voltage applied to the PDA module can be stabilized and thus loss of data in the complex terminal can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A power control apparatus of a complex terminal which includes a main battery and an auxiliary battery, the power control apparatus comprising:
   a DC/DC converter for outputting an auxiliary power supplied from the auxiliary battery after adjusting a level of voltage of the auxiliary power to a required input voltage level of the complex terminal;
   a second voltage sensor for measuring voltage of only a main power outputted from the main battery, and controlling the auxiliary power of the auxiliary battery to be inputted to the DC/DC converter when the measured voltage of the main power is reduced to a second predetermined voltage; and
   a first voltage sensor for interrupting power from the main battery to the complex terminal when the measured voltage of the main power becomes lower than a first predetermined voltage, which is lower than the second predetermined voltage.

2. The power control apparatus as claimed in claim 1, wherein the first predetermined voltage is a minimum voltage capable of operating the power control apparatus.

3. A power control apparatus of a complex terminal which includes a main battery, an auxiliary battery, and a control unit, the power control apparatus comprising:
   a DC/DC converter for outputting an auxiliary power supplied from the auxiliary battery after adjusting a level of voltage of the auxiliary power to a required input voltage level of the control unit;
   a first switch for selectively connecting the control unit to one of the main battery and the DC/DC converter;
   a second switch for connecting or disconnecting the auxiliary battery and the DC/DC converter;
   a first voltage sensor for controlling the first switch to connect the control unit with the DC/DC converter, thereby interrupting supply of a main power from the main battery to the control unit and enabling the auxiliary power outputted from the DC/DC converter to be supplied to the control unit, when voltage of the main power supplied from the main battery becomes lower than a first predetermined voltage; and
   a second voltage sensor for controlling the second switch to connect the auxiliary battery and the DC/DC converter so that the auxiliary power of the auxiliary battery can be inputted to the DC/DC converter, when the voltage of the main power is reduced to a second predetermined voltage, which is higher than the first predetermined voltage.

4. The power control apparatus as claimed in claim 3, wherein the first predetermined voltage is a minimum voltage capable of operating the power control apparatus.

5. A power control apparatus of a complex terminal which includes an external main battery, an embedded auxiliary battery, and a PDA (Personal Digital Assistant) controller, the power control apparatus comprising:
   a PDA power supply for outputting a main power supplied from the main battery after adjusting a level of voltage of the main power to a required input voltage level of the PDA controller;
   a DC/DC converter for outputting an auxiliary power supplied from the auxiliary battery after adjusting a level of voltage of the auxiliary power to the input voltage level of the PDA controller;
   a first switch for selectively connecting the PDA controller to one of the PDA power supply and the DC/DC converter;
   a first voltage sensor for outputting an interrupt signal which indicates that the PDA controller cannot receive the main power from the main battery, and controlling the first switch to connect the PDA controller with the DC/DC converter so that the PDA controller can receive the auxiliary power from the auxiliary battery, when the voltage of the main power from the main battery becomes lower than a first voltage;
   a second switch for connecting or disconnecting the auxiliary battery and the DC/DC converter; and
   a second voltage sensor for controlling the second switch to connect the auxiliary battery and the DC/DC converter so that the auxiliary power of the auxiliary battery can be applied to the PDA controller, when the voltage of the main power from the main battery becomes lower than a second voltage; wherein,
   when the PDA controller receives the interrupt signal and is connected with the DC/DC converter, the PDA controller instantly receives the auxiliary power from the auxiliary battery, enters into a sleep mode, and stores current data.

6. The power control apparatus as claimed in claim 5, wherein the first voltage sensor directs the first switch to connect the PDA controller with the PDA power supply so that the PDA controller can receive the main power from the main battery. when the voltage of the main power from the main battery is higher than the first voltage.

7. The power control apparatus as claimed in claim 5, wherein the second voltage sensor directs the second switch to disconnect the auxiliary battery and the DC/DC converter from each other when the voltage of the main power from the main battery is higher than the second voltage.

8. The power control apparatus as claimed in claim 5, wherein the first voltage is a minimum voltage capable of operating the PDA controller.

9. The power control apparatus as claimed in claim 5, wherein the difference between the second voltage and the first voltage is sufficient for normal operation of the PDA controller before the PDA controller receives the interrupt signal and enters into the sleep mode.

10. The power control apparatus as claimed in claim 5, wherein the second voltage is greater than the first voltage.

11. The power control apparatus as claimed in claim 5, further comprising:
    a charger for charging the auxiliary battery by means of the main power supplied from the main battery when the charger is connected with the main battery: and
    a third switch for connecting or disconnecting the main battery and the charger, wherein
    the second voltage sensor directs the third switch to connect the main battery and the charger so that the auxiliary battery can be charged, when the voltage of the main power from the main battery is higher than the second voltage.

12. The power control apparatus as claimed in claim 3, wherein the difference between the second predetermined voltage and the first predetermined voltage is sufficient for normal operation of the PDA controller before the PDA controller receives the interrupt signal and enters into the sleep mode.

13. The power control apparatus as claimed in claim 3, wherein the second predetermined voltage is greater than the first predetermined voltage.

14. The power control apparatus as claimed in claim 5, wherein the PDA controller instantly receives the auxiliary power from the auxiliary battery when the PDA controller receives the interrupt signal and is connected with the DC/DC converter.

15. The power control apparatus of claim 1, wherein the second predetermined voltage is greater than the first predetermined voltage.

* * * * *